(12) United States Patent
Retzlaff et al.

(10) Patent No.: US 10,091,942 B2
(45) Date of Patent: Oct. 9, 2018

(54) BALER WITH AUTOMATED POSITIONING OF PLUNGER

(71) Applicant: AGCO Corporation, Hesston, KS (US)

(72) Inventors: Lawrence D. Retzlaff, Hesston, KS (US); Robert J. Waggoner, Hesston, KS (US); Kevin M. Tacke, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 39 days.

(21) Appl. No.: 15/505,140

(22) PCT Filed: Sep. 3, 2015

(86) PCT No.: PCT/US2015/048217
§ 371 (c)(1),
(2) Date: Feb. 20, 2017

(87) PCT Pub. No.: WO2016/036894
PCT Pub. Date: Mar. 10, 2016

(65) Prior Publication Data
US 2017/0265398 A1 Sep. 21, 2017

Related U.S. Application Data

(60) Provisional application No. 62/045,311, filed on Sep. 3, 2014.

(51) Int. Cl.
*A01F 15/04* (2006.01)
*A01F 15/08* (2006.01)

(52) U.S. Cl.
CPC ........ *A01F 15/042* (2013.01); *A01F 15/0841* (2013.01); *A01F 15/0875* (2013.01)

(58) Field of Classification Search
CPC .... A01F 15/04; A01F 15/042; A01F 15/0841; A01F 15/0875; A01F 15/046; A01F 15/044; G05B 15/02
(Continued)

(56) References Cited

U.S. PATENT DOCUMENTS

| 6,105,353 A | 8/2000 | Mohr et al. |
| 2001/0042362 A1 | 11/2001 | Scarlett et al. |

(Continued)

FOREIGN PATENT DOCUMENTS

| EP | 0175916 A2 | 4/1986 |
| WO | 2014/128100 A1 | 8/2014 |

OTHER PUBLICATIONS

European Patent Office, International Search Report for parent PCT Application No. PCT/US2015/048217, dated Feb. 3, 2016.
(Continued)

*Primary Examiner* — Jimmy T Nguyen

(57) ABSTRACT

A baling system acts at shut-down to automatically pre-position a plunger so that it is just past a rear-dead-center position when the baler is restarted, thereby minimizing the load on a power take-off during the next restart. In particular, when the power take-off is deactivated, a control unit automatically brakes the power take-off so that the plunger stops in the desired position. Alternatively, the baling system acts at restart-up to automatically repeatedly activate and deactivate the power take-off in order to accelerate the plunger to a predetermined minimum operating speed before activating the power take-off for continuous operation, thereby maximizing a flywheel's momentum during the restart.

13 Claims, 4 Drawing Sheets

(58) Field of Classification Search
USPC .......................................... 100/179; 700/275
See application file for complete search history.

(56)     References Cited

U.S. PATENT DOCUMENTS

| | | |
|---|---|---|
| 2009/0235628 A1 | 9/2009 | Willamette |
| 2010/0115902 A1 | 5/2010 | Schlesser et al. |
| 2013/0116895 A1 | 5/2013 | Smith et al. |
| 2014/0137757 A1* | 5/2014 | Nelson ................ A01F 15/0841 100/102 |
| 2014/0165859 A1 | 6/2014 | O'Reilly et al. |
| 2016/0000012 A1* | 1/2016 | Bonte ................ A01F 15/0841 700/275 |

OTHER PUBLICATIONS

UK Intellectual Property Office, International Search Report for sister UK Application No. GB1417678.8, transmittal dated Apr. 8, 2015.

European Patent Office, International Search Report for related European Application No. EP17186366, dated Jan. 5, 2018.

* cited by examiner

BALER WITH AUTOMATED POSITIONING OF PLUNGER

CROSS REFERENCE TO RELATED APPLICATION

This application claims the benefit of U.S. Provisional Application No. 62/045,311, filed Sep. 3, 2014, which is hereby incorporated by reference in its entirety.

BACKGROUND OF THE INVENTION

Field of Invention

The present invention relates to systems and methods for controlling the operation of balers.

Description of Related Art

Large square balers are used in the agricultural industry to create large substantially rectangular bales of crop material by moving over crop windrows to collect loose crop material, compress the material, and form it into bales that are then tied and ejected. To that end, a baler is typically mechanically coupled with a tractor, and a power take-off (PTO) mechanism transfers power from the tractor's engine to drive the baler's operation. A rotary pick-up at the front of the baler picks up the loose crop material and moves it into a stuffer chamber. Once the stuffer chamber is full, its contents are moved through a stuffer chute into a forming chamber. A reciprocating plunger compresses the crop material in the forming chamber into a growing bale. Once the bale reaches a predetermined length, which could be eight feet, it is tied and ejected through a discharge outlet to fall onto the ground behind the baler. The process then continues to create the next bale.

Starting a large baler requires substantial PTO torque to overcome the resting inertia of its flywheel and other components. The required torque is substantially increased during restarting if the plunger is initially positioned against a bale in the forming chamber, and the additional load of the bale as the reciprocating plunger attempts to push past its "rear-dead-center" position can result in stalling the tractor engine or disengaging the PTO.

This background discussion is intended to provide information related to the present invention which is not necessarily prior art.

OVERVIEW OF THE INVENTION

Embodiments of the present invention solve the above-described and other problems and limitations by decreasing the amount of torque required to restart the baler, maximizing the flywheel's momentum when the plunger contacts the bale in the forming chamber, and minimizing the risk of stalling the tractor engine or disengaging the PTO.

In a first embodiment of the present invention, a baling system acts at shut-down to substantially automatically pre-position the plunger so that it is just past a rear-dead-center position when the baler is restarted. In this first embodiment, the baling system may broadly comprise a forming chamber having a discharge outlet, wherein the bale is located in the forming chamber; the plunger operable to move in a reciprocating manner within the forming chamber from a front-dead-center position in which the plunger is furthest from the bale to the rear-dead-center position in which the plunger is closest to the bale; a communication bus extending between the baler and the tractor and operable to transmit electrical signals; a plunger position sensor operable to sense a position of the plunger in the forming chamber; a PTO speed sensor operable to sense a speed of the PTO; and a control unit in communication with the tractor, the plunger position sensor, and the PTO speed sensor, and operable to substantially automatically pre-position the plunger at a predetermined position after the PTO is deactivated. To that end, the control unit is further operable to receive a deactivation signal sent by the tractor to the PTO over the communication bus, release a pressure in the forming chamber, repeatedly apply a braking force to the PTO for a first braking interval and remove the braking force for a second braking interval until the PTO has slowed to a predetermined maximum speed based on information received from the PTO speed sensor, and then constantly apply the braking force so that the plunger stops at the predetermined position.

In various implementations of this first embodiment, the baling system may further include any one or more of the following additional features. The baling system may further include a crankshaft operable to transfer power from the PTO to the plunger, and wherein the plunger position sensor is mounted on the crankshaft. The length of the first braking interval and the length of the second braking interval may both be determined by the speed of the PTO. Relatedly, the control unit may be operable to access a look-up table in which is stored the length of the first braking interval and the length of the second braking interval, or the control unit may be further operable to calculate the length of the first braking interval and the length of the second braking interval based on the speed of the PTO. The predetermined position of the plunger may be approximately between a rear-dead-center position and the rear-dead-center position plus 10 degrees, or the predetermined position of the plunger may be approximately just after the rear-dead-center position.

In a second embodiment, the baling system acts at restart-up to substantially automatically repeatedly activate and deactivate the PTO in order to accelerate the plunger to at least a predetermined minimum operating speed before activating the PTO for continuous operation. In this second embodiment, the baling system may broadly comprise the forming chamber; the plunger; the communication bus; a plunger speed sensor operable to sense a speed of the plunger in the forming chamber; and the control unit in communication with the tractor and the plunger speed sensor, and operable to substantially automatically accelerate the plunger to the predetermined minimum speed after the PTO is activated. To that end, the control unit may be further operable to receive an activation signal sent by the tractor to the PTO over the communication bus, repeatedly activate and deactivate the PTO for an activation interval until the plunger has reached the predetermined minimum speed based on information received from the plunger speed sensor, and then leave the PTO constantly activated for normal operation.

In various implementations of this second embodiment, the baling system may further include any one or more of the following additional features. The baling system may further include a crankshaft operable to transfer power from the PTO to the plunger, and wherein the plunger speed sensor is mounted on the crankshaft. The length of the activation interval may be determined by the speed of the plunger. Relatedly, the control unit may be further operable to access a look-up table in which is stored the length of the activation interval, or the control unit may be further operable to calculate the length of the activation interval based on the speed of the plunger.

Additionally, each of these embodiments and implementations may be alternatively characterized as methods based on their functionalities.

This summary is not intended to identify essential features of the present invention, and is not intended to be used to limit the scope of the claims. These and other aspects of the present invention are described below in greater detail.

BRIEF DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DESCRIPTION OF EXAMPLE EMBODIMENTS

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a baling system that decreases the amount of torque required to restart a baler, maximizes a flywheel's momentum when a plunger contacts a bale, and minimizes a risk of stalling a tractor engine or disengaging a PTO. In a first embodiment, the baling system acts at shut-down to substantially automatically pre-position the plunger so that it is just past a rear-dead-center position when the baler is restarted. In a second embodiment, the baling system acts at restart-up to substantially automatically repeatedly activate and deactivate the PTO in order to accelerate the plunger to at least a predetermined minimum operating speed before activating the PTO for continuous operation. Thus, the first embodiment pre-positions the plunger during shut-down to give the plunger a "running start" at the next restart, and the second embodiment "gooses" the plunger during restart to accelerate it to a minimum operating speed.

Figure 1:
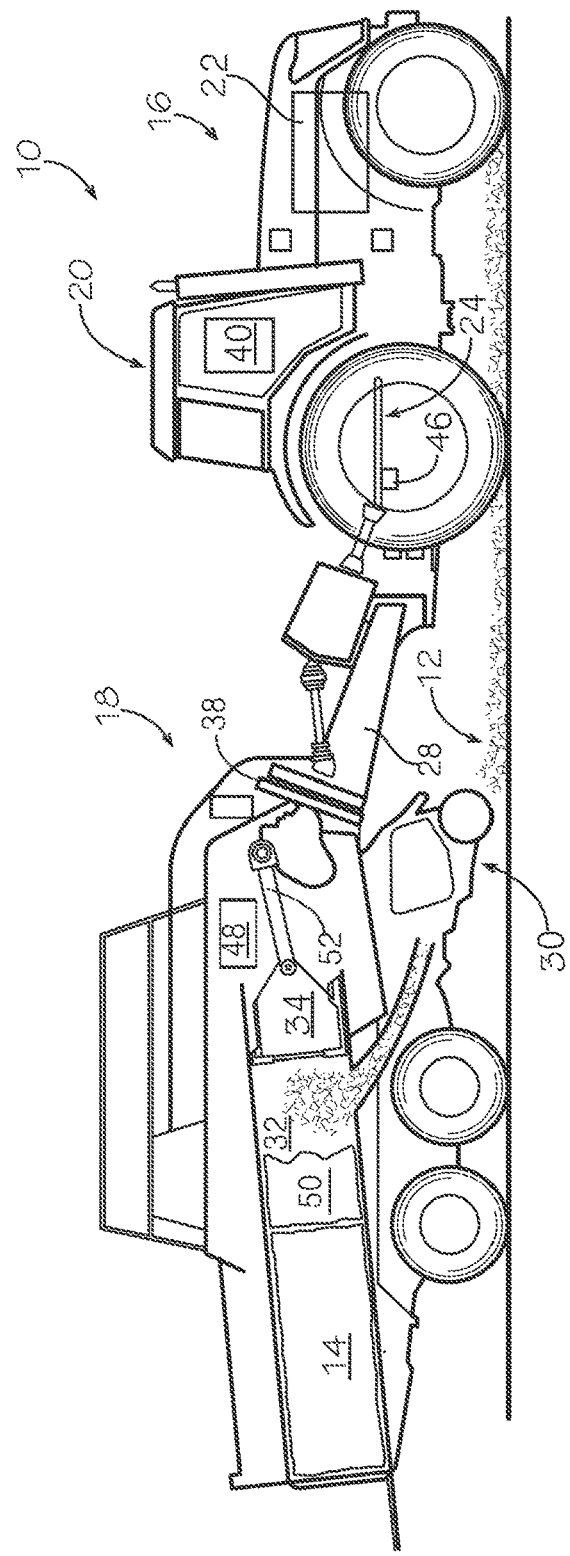
FIG. 1 is a cross-sectional elevation view of a baling system constructed in accordance with an embodiment of the present invention.
Figure 2:
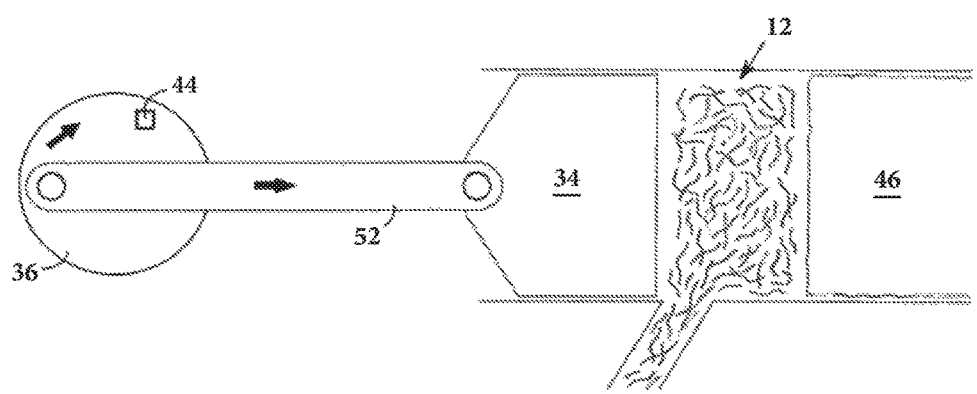
FIG. 2 is a cross-sectional elevation view of the baling system of FIG. 1 showing a plunger in a front-dead-center position and other components.
Figure 3:
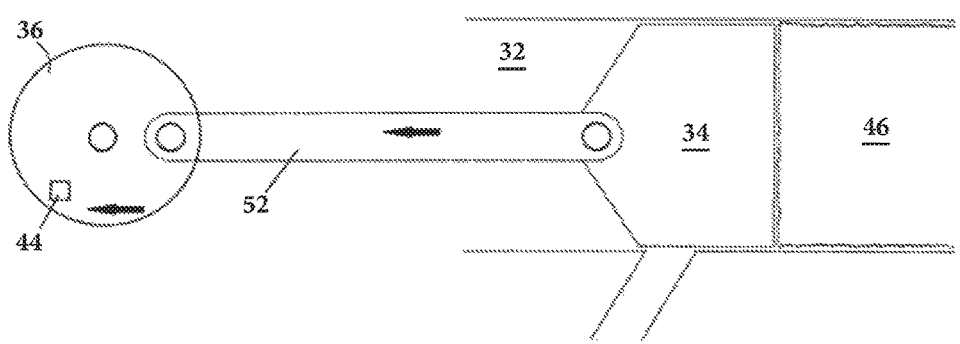
FIG. 3 is cross-sectional elevation view of the plunger of FIG. 2 in a rear-dead-center position and the other components.

Referring to FIGS. 1, 2, and 3, an embodiment of the baling system 10 is operable to receive loose crop material 12 and form it into a substantially rectangular finished bale 14. The baling system 10 may broadly comprise a tractor 16 and a baler 18. The tractor 16 may include a cab 20 wherein an operator is located; an engine 22 operable to move the tractor 16; and a PTO 24 operable to transfer mechanical power from the engine 22 to the baler 18 or other connected machinery. The baler 18 may broadly comprise a frame 28 mechanically coupled with the tractor 16; a loose crop material receiving component 30; a forming chamber 32; a plunger 34; a crankshaft 36; a flywheel 38; a communication bus 40 extending between the tractor 16 and the baler 18; one or more plunger sensors 44; one or more PTO sensors 46; and an electronic control unit (ECU) 48.

The loose crop material receiving component 30 may be operable to collect loose crop material 12 from the ground for baling. To that end, the loose crop material receiving component 30 may include an arbor component operable to pick up the loose crop material 12 from the ground, a cutter component operable to cut the collected loose crop material 12, and a feeder component operable to feed the loose crop material 12 into a stuffer chute connected to the forming chamber 32. The forming chamber 32 may be operable to receive loose crop material 12 from the stuffer chute via a stuffer chute inlet, and hold the loose crop material 12 as it is compressed by the plunger 34 into a growing unfinished bale 50. The forming chamber 32 may be substantially rectangular in shape to facilitate the compression and forming process.

The plunger 34 may be operable to compress the loose crop material 12 into the unfinished bale 50 by moving within the forming chamber 32 in a reciprocating manner. More specifically, the plunger 34 repeatedly extends into the forming chamber 32 to compress the loose crop material already present therein, and retracts to allow additional loose crop material to enter via the stuffer chute inlet. A connecting rod 52 may connect the plunger 34 to the crankshaft 36. The crankshaft 36 may mechanically couple and be operable to transfer power from the PTO 24 to the plunger 34. The flywheel 38 may be operable to store and release kinetic energy from the PTO 24 in order to provide greater inertial mass to smooth the operation of the plunger 34.

The communication bus 40 may be operable to communicate electrical signals bi-directionally between the tractor 16 and the baler 18, especially the ECU 48, to facilitate baling operations. In one implementation, the communication bus 40 may be a controller area network (CAN). In alternative implementations, the communication bus 40 may include a wire connection or a wireless connection between the tractor 16 and the baler 18.

The one or more plunger sensors 44 may be operable to determine or provide information to the ECU 48 for determining a position and a speed of the plunger 34 as it moves within the forming chamber 32. In one implementation, the one or more plunger sensors 44 may be mounted on the crankshaft 36, wherein the rotational speed of the crankshaft 36 is at least reflective of the speed of the PTO 24 and equivalent to the speed of the plunger 34. The one or more PTO sensors 46 may be operable to determine or provide information to the ECU 48 for determining a speed of the PTO 24.

The ECU 48 may be operable to receive input signals from the one or more plunger sensors 44 and the one or more PTO sensors 46 and provide output signals to the various components of the baling system 10 to substantially automatically accomplish, in the first embodiment of the present invention, the pre-positioning of the plunger 34 during shut-down or, in the second embodiment, the acceleration of the plunger 34 during restart-up.

Figure 4:
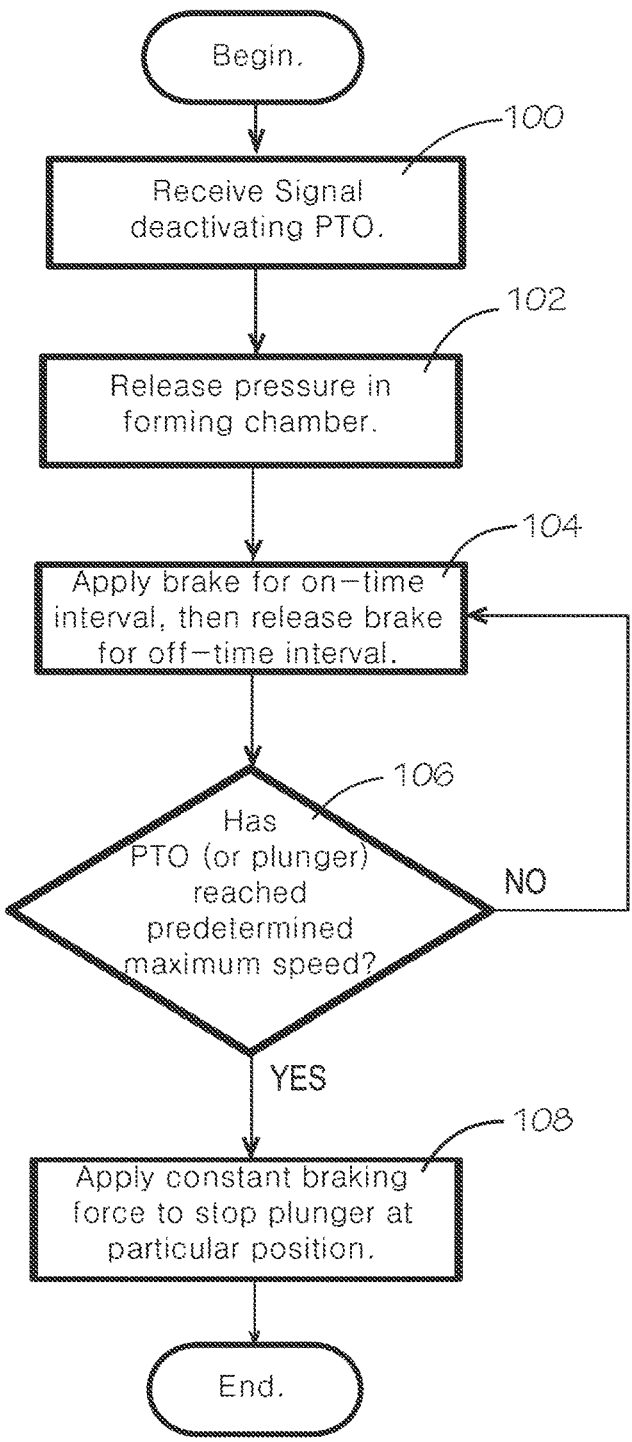
FIG. 4 is a flow diagram of method steps performed by a first embodiment of the baling system of FIG. 1.

In operation, the baling system 10 may function as follows. In both embodiments, operation begins with an unfinished bale 50 located in the forming chamber 32. In the first embodiment, the present invention acts at shut-down to electronically sense the position and speed of the plunger 34 during deactivation of the PTO 24 and apply a braking force to stop the plunger 34 within a particular range of positions or at a particular position that reduces the torque required when re-starting the system. Referring to FIG. 4, the ECU 48 monitors the communication bus 40 for a signal from the tractor 16 which deactivates the PTO 24, and when the ECU 48 receives the deactivation signal, as shown in step 100, the ECU 48 releases the pressure (associated with the compression of the growing bale 50) in the forming chamber 32, as shown in step 102, in order both to ease subsequent restart-up and to make it easier to predict when the plunger 34 will stop.

The speed of the crankshaft 36 during normal operation may be approximately 50 revolutions per minute, such that the plunger 34 moves from front-dead-center (seen in FIG. 2) to rear-dead-center (seen in FIG. 3) and back in a little over 1 second. However, once the PTO 24 is deactivated, the PTO 24 and the plunger 34 begin to slow due to friction. The ECU 48 sends a control signal to apply a braking force to the PTO 24 for an on-time braking interval and then deactivates the braking force for an off-time braking interval, as shown in step 104. Both the on-time braking interval and the off-time braking interval may be measured in seconds. Both the on-time braking interval and the off-time braking interval may be dependent on the PTO speed, and may be provided in a look-up table stored in a memory accessible by the ECU 48 or may be mathematically determined by the ECU 48 using one or more equations relating the on-time braking interval and the off-time braking interval to PTO speed. In another implementation, the on-time and off-time braking intervals may be alternatively or additionally dependent on the plunger speed sensed by the one or more plunger sensors 44. The braking force may be a frictional, magnetic, or other force applied to the flywheel 38 or to one or more other components.

The ECU 48 receives input from the one or more PTO sensors 46 (and/or plunger sensors 44) regarding the speed of the PTO 24 (and/or plunger 34). As necessary, the ECU 48 repeatedly applies the braking force to the PTO 24 for the on-time braking interval and then deactivates it for the off-time braking interval until the PTO 24 (and/or plunger 34) slows to a predetermined maximum speed, as shown in step 106. The ECU 48 receives input from the one or more plunger sensors 44 regarding the speed and position of the plunger 34, and once the PTO reaches the pre-determined maximum speed, the ECU 48 constantly applies the braking force to bring the PTO 24 to a stop in such a manner as to bring the plunger 34 to a stop within the range of particular positions or at the particular position, as show in step 108. The range of particular positions may be approximately between rear-dead-center and rear-dead-center plus 10 degrees, and the particular position may be approximately just after rear dead center, i.e., just after the plunger 34 has contacted and separated from the bale 50 and is beginning to move away from the bale 50.

Figure 5:
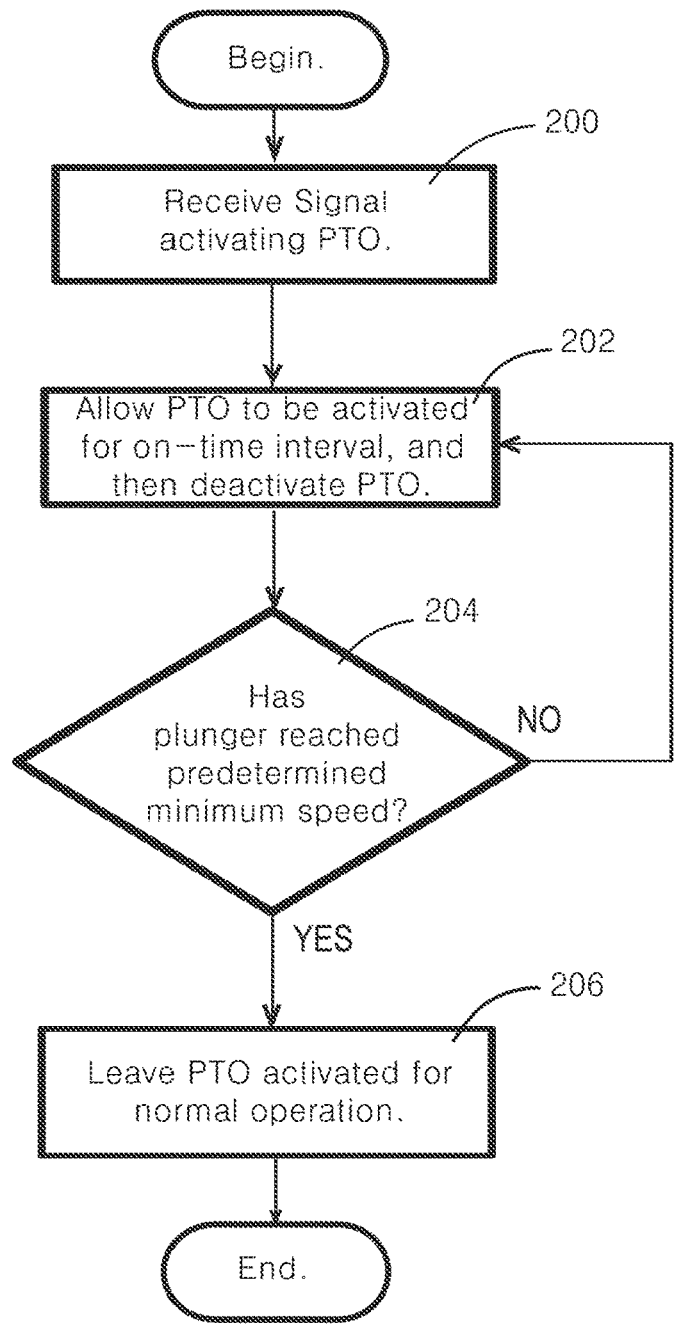
FIG. 5 is a flow diagram of method steps performed by a second embodiment of the baling system of FIG. 1.

In the second embodiment, the present invention acts at start-up to electronically sense the speed of the plunger 34 during activation, and controls activation of the PTO 24 to bring the plunger 34 to at least a predetermined minimum speed that allows for constantly activating the PTO 24 under minimized inertial load. Referring to FIG. 5, the ECU 48 monitors the communication bus 40 for a signal from the tractor 16 which activates the PTO 24, and when the ECU 48 receives the activation signal, as shown in step 200, the ECU 48 allows the PTO 24 to be activated for an on-time activation interval and then the ECU 48 sends a signal to the tractor 16 to deactivate the PTO 44, as shown in step 202. The on-time activation interval may be measured in seconds. The on-time activation interval is dependent on the speed of the plunger 34, and may be provided in a look-up table stored in a memory accessible by the ECU 48 or may be mathematically determined by the ECU 48 using one or more equations relating the on-time activation interval to plunger speed.

The ECU 48 receives input from the one or more plunger sensors 44 regarding the speed of the plunger 34, and, as necessary, the ECU 48 repeatedly activates the PTO 24 for the on-time activation interval and then deactivates it until the plunger 34 reaches a predetermined minimum speed, as shown in step 204. Once the plunger 34 reaches the predetermined minimum speed, the ECU 48 leaves the PTO 24 activated for normal operation, as shown in step 206.

It will be appreciated that both the first and second embodiments may be incorporated into the baling system 10, with the first embodiment being used when stopping and the second embodiment being used when starting, or only one of the embodiments may be incorporated into the baling system 10. If only the second embodiment is incorporated into the baling system 10, then the plunger 34 may not be stopped at any particular position when stopping.

Thus, the present invention provides advantages over the prior art, including that it decreases the amount of torque required to restart the baler 18, maximizes the flywheel's momentum when the plunger 34 contacts the bale 50, and minimizes the risk of stalling the tractor engine 22 or disengaging the PTO 24.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A baling system operable to receive loose material, form the loose material into a bale, and eject the bale, wherein the baling system is powered by a power take-off associated with a tractor, the baling system comprising:
   a forming chamber having a discharge outlet, wherein the bale is located in the forming chamber;
   a plunger operable to move in a reciprocating manner within the forming chamber from a front-dead-center position in which the plunger is furthest from the bale to a rear-dead-center position in which the plunger is closest to the bale;
   a communication bus extending between the baler and the tractor and operable to transmit electrical signals;
   a plunger position sensor configured to sense a position of the plunger in the forming chamber;

a power take-off speed sensor configured to sense a speed of the power take-off; and a control unit in communication with the tractor, the plunger position sensor, and the power take-off speed sensor, and the control unit configured to automatically preposition the plunger at a predetermined position after the power take-off is deactivated, wherein the control unit configured to receive a deactivation signal sent by the tractor to the power take-off over the communication bus, release a pressure in the forming chamber, repeatedly apply a braking force to the power take-off for a first braking interval and remove the braking force for a second braking interval until the power take-off has slowed to a predetermined maximum speed based on information received from the power take-off speed sensor, and then constantly applies the braking force so that the plunger stops at the predetermined position within the forming chamber.

2. The baling system as set forth in claim 1, the baling system further including a crankshaft operable to transfer power between the power take-off and the plunger, and wherein the plunger position sensor is mounted on the crankshaft.

3. The baling system as set forth in claim 1, wherein a length of the first braking interval and a length of the second braking interval are both determined by the speed of the power take-off.

4. The baling system as set forth in claim 3, wherein the control unit is further operable to access a look-up table in which is stored the length of the first braking interval and the length of the second braking interval.

5. The baling system as set forth in claim 3, wherein the control unit is further operable to calculate the length of the first braking interval and the length of the second braking interval based on the speed of the power take-off.

6. The baling system as set forth in claim 1, wherein the predetermined position of the plunger is approximately between the rear-dead-center position and the rear-dead-center position plus 10 degrees.

7. The baling system as set forth in claim 6, wherein the predetermined position of the plunger is approximately just after the rear-dead-center position.

8. A method of shutting off a baler, wherein the baler is coupled with a power take-off on a tractor, and wherein the baler includes a plunger operable to move in a reciprocating manner within a forming chamber, the method comprising the steps of:

(1) receiving at an electronic control unit a deactivation signal sent by the tractor to the power take-off over a communication bus;

(2) sending from the electronic control unit a first control signal to release a pressure in the forming chamber;

(3) sending from the electronic control unit a second control signal to apply a braking force to the power take-off for a first braking interval and a third control signal to remove the braking force for a second braking interval;

(4) electronically sensing a speed of the power take-off and repeating step (3) until the power take-off has slowed to a predetermined maximum speed; and (5) sending from the electronic control unit a fourth control signal to constantly apply the braking force so that the plunger stops at a predetermined position within the forming chamber.

9. The method as set forth in claim 8, wherein a length of the first braking interval and a length of the second braking interval are both determined by the speed of the power take-off.

10. The method as set forth in claim 9, further including the step of accessing by the electronic control unit a look-up table in which is stored the length of the first braking interval and the length of the second braking interval.

11. The method as set forth in claim 9, further including the step of calculating by the electronic control unit the length of the first braking interval and the length of the second braking interval based on the speed of the power take-off.

12. The method as set forth in claim 8, wherein the predetermined position of the plunger is approximately between a rear-dead-center position and the rear-dead-center position plus 10 degrees.

13. The method as set forth in claim 12, wherein the predetermined position of the plunger is approximately just after the rear-dead-center position.

* * * * *